(12) United States Patent
Lin et al.

(10) Patent No.: US 12,326,625 B2
(45) Date of Patent: Jun. 10, 2025

(54) TILED LIGHT TRANSMITTING CONTROLLER

(71) Applicant: InnoLux Corporation, Miao-Li County (TW)

(72) Inventors: Bi-Ly Lin, Miao-Li County (TW); Chih-Chung Hsu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 221 days.

(21) Appl. No.: 18/145,970

(22) Filed: Dec. 23, 2022

(65) Prior Publication Data
US 2023/0236451 A1 Jul. 27, 2023

(30) Foreign Application Priority Data
Jan. 24, 2022 (CN) .......................... 202210077699.6

(51) Int. Cl.
*G02F 1/1333* (2006.01)
*G02F 1/1335* (2006.01)
*G02F 1/1339* (2006.01)

(52) U.S. Cl.
CPC .... *G02F 1/13336* (2013.01); *G02F 1/133512* (2013.01); *G02F 1/1339* (2013.01)

(58) Field of Classification Search
CPC .......... G02F 1/13336; G02F 1/133512; G02F 1/1339
See application file for complete search history.

(56) References Cited

U.S. PATENT DOCUMENTS

| | | | | |
|---|---|---|---|---|
| 5,106,197 A | * | 4/1992 | Ohuchida | G02F 1/1362 349/122 |
| 5,164,853 A | * | 11/1992 | Shimazaki | G02F 1/13336 349/149 |
| 2017/0168327 A1 | | 6/2017 | Han et al. | |
| 2018/0284521 A1 | | 10/2018 | Kong et al. | |
| 2023/0350258 A1 | * | 11/2023 | Xiong | G02F 1/163 |
| 2024/0036384 A1 | * | 2/2024 | Huang | G02F 1/133528 |

FOREIGN PATENT DOCUMENTS

| CN | 112585529 A | 3/2021 |
|---|---|---|
| TW | I492202 B | 7/2015 |

* cited by examiner

*Primary Examiner* — Michael H Caley
*Assistant Examiner* — David Y Chung
(74) *Attorney, Agent, or Firm* — MUNCY, GEISSLER, OLDS & LOWE, P.C.

(57) ABSTRACT

A tiled light transmitting controller includes a first panel, a second panel, a first cover plate and a second cover plate. The second panel is electrically connected to the first panel. The second cover plate is arranged to be opposite to the first cover plate. The first panel and the second panel are arranged between the first cover plate and the second cover plate.

18 Claims, 10 Drawing Sheets

TILED LIGHT TRANSMITTING CONTROLLER

CROSS REFERENCE TO RELATED APPLICATION

This application claims the benefits of the Chinese Patent Application Serial Number 202210077699.6, filed on Jan. 24, 2022, the subject matter of which is incorporated herein by reference.

BACKGROUND

1. Field of the Disclosure

The present disclosure relates to a light transmitting controller and, more particularly, to a tiled light transmitting controller.

2. Description of Related Art

In recent years, with the development of science and technology and the awareness of environmental protection, various energy-saving and carbon-reducing products have been produced correspondingly, such as light transmitting controllers for smart windows. The smart window refers to a device that can change the light transmittance of the glass plate of the window to present a light transmitting state, a dark state, or a fog state, so as to achieve light transmitting and/or thermal insulation effects. In addition, because of having the functions such as shielding and/or privacy, the smart windows may also be applied to conference rooms, indoor partition design, etc., for making the space more flexible.

However, the current light transmitting controllers still have many shortcomings, such as the inability of driving large-sized light transmitting controllers in multiple zones, the appearance of halo in the light transmitting state, or the lack of darkness in the dark state.

Therefore, there is an urgent need to provide an improved light transmitting controller to mitigate and/or obviate the aforementioned defects.

SUMMARY

To achieve the aforementioned object, the present disclosure provides a tiled light transmitting controller, which includes: a first panel; a second panel electrically connected to the first panel; a first cover plate; and a second cover plate arranged to be opposite to the first cover plate, wherein the first panel and the second panel are arranged between the first cover plate and the second cover plate.

Other novel features of the present disclosure will become more apparent from the following detailed description when taken in conjunction with the accompanying drawings.

DETAILED DESCRIPTION OF EMBODIMENT

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided.

Furthermore, in the specification and claims, unless otherwise specified, ordinal numbers, such as "first", "second" and "third" used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In addition, the position mentioned in the specification and the claims, such as "above", "on" or "over", may mean that the two elements are in direct contact, or not in direct contact. Similarly, the position mentioned in the specification and the claims, such as "below", "under" or "beneath" may mean that the two elements are in direct contact, or not in direct contact. Moreover, it will be understood that if devices in the figures were turned upside down, elements described to be "above" a certain side would then become elements described to be "below" the certain side.

The following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments.

Figure 1A:
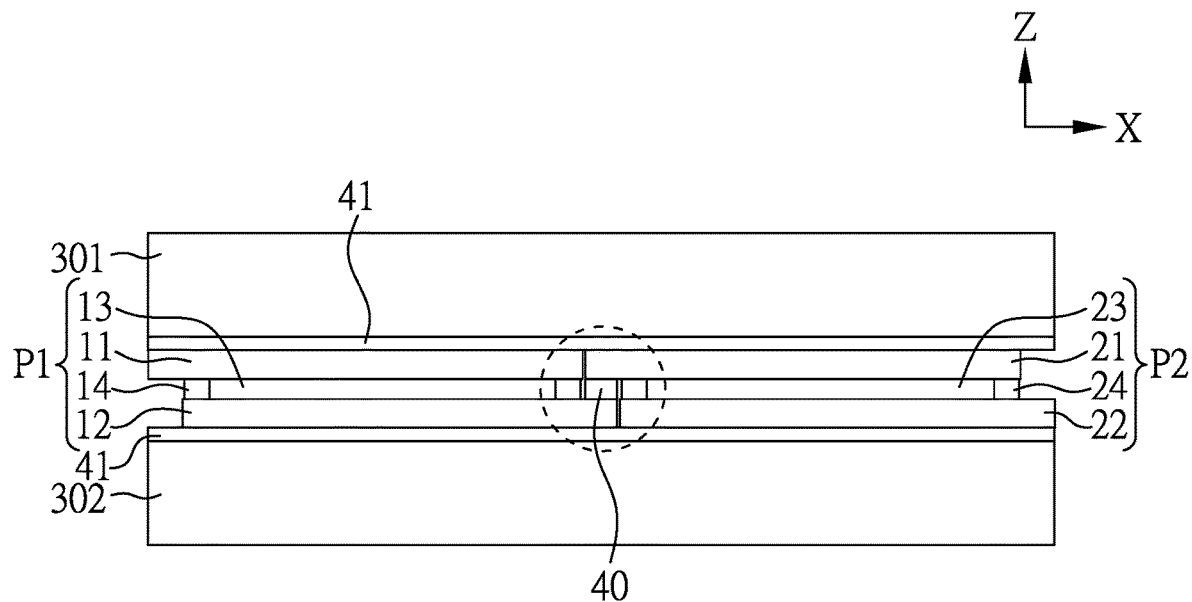
FIG. 1A is a schematic diagram illustrating the tiled light transmitting controller according to an embodiment of the present disclosure.
Figure 1B:
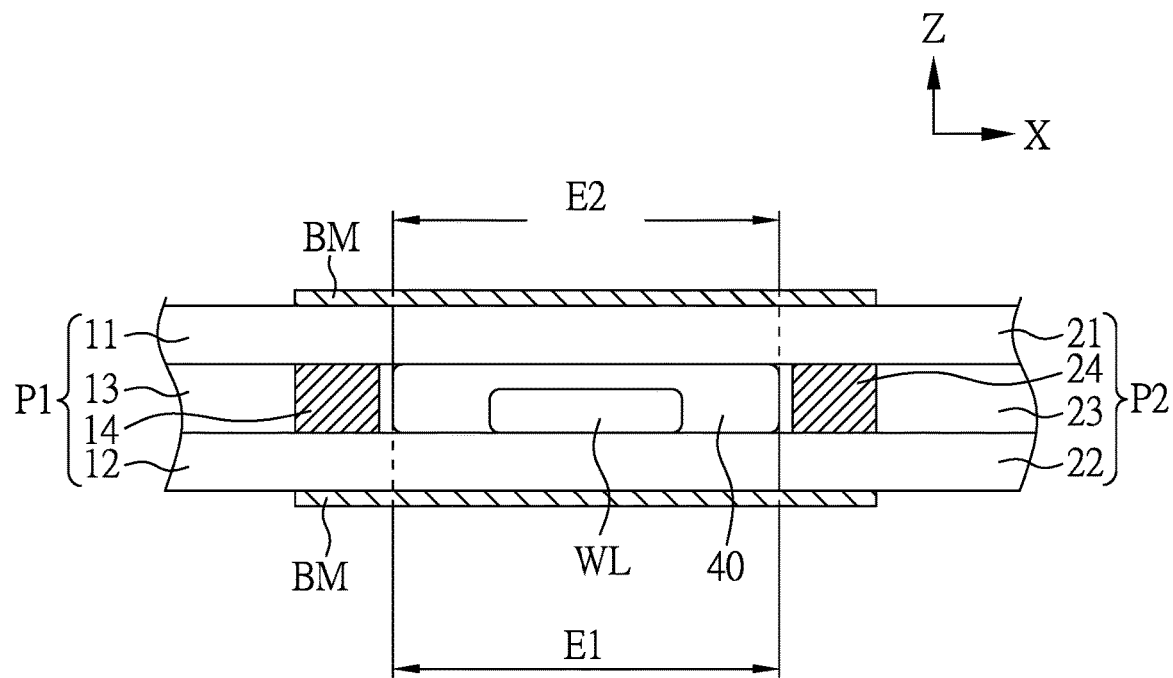
FIG. 1B is a partial enlarged view of FIG. 1A.

FIG. 1A is a schematic diagram of a tiled light transmitting controller according to an embodiment of the present disclosure. FIG. 1B is a partial enlarged view of FIG. 1A.

As shown in FIG. 1A, the tiled light transmitting controller of the present disclosure includes: a first panel P1; a second panel P2, which is electrically connected to the first panel P1; a first cover plate 301, wherein, in the top view direction Z of the first panel P1, the first cover plate 301 overlaps with the first panel P1 and the second panel P2; and a second cover plate 302, which is arranged to be opposite to the first cover plate 301, wherein the first panel P1 and the second panel P2 are arranged between the first cover plate 301 and the second cover plate 302. In the present disclosure, by arranging a plurality of panels between the first cover plate 301 and the second cover plate 302, it is able to achieve multi-zone driving, or to eliminate the dark state taste problem and other defects.

In the present disclosure, the first panel P1 may further include: a first substrate 11; a second substrate 12 arranged to be opposite to the first substrate 11; a first light modulation layer 13 arranged between the first substrate 11 and the second substrate 12; and a first seal 14 arranged between the first substrate 11 and the second substrate 12 and surrounding the first light modulation layer 13. Similarly, in the present disclosure, the second panel P2 may further include: a third substrate 21; a fourth substrate 22 arranged to be opposite to the third substrate 21; a second light modulation layer 23 arranged between the third substrate 21 and the fourth substrate 22; and a second seal 24 arranged between the third substrate 21 and the fourth substrate 22 and surrounding the second light modulation layer 23. The first panel P1 and the second panel P2 may be electrically connected to the third substrate 21 through the second substrate 12 so as to achieve the effect of being electrically connected to each other. In one embodiment of the present disclosure, in the top view direction Z of the first panel P1, the second substrate 12 may be disposed under the first substrate 11 and, similarly, in the top view direction Z of the first panel P1, the fourth substrate 22 may be disposed under the third substrate 21.

In the present disclosure, as shown in FIG. 1A, the first substrate 11 and the second substrate 12 of the first panel P1 may be arranged with displacement in the first direction X and, similarly, the third substrate 21 and the fourth substrate 22 of the second panel P2 may also be arranged with displacement in the first direction X, wherein the second substrate 12 and the third substrate 21 may be partially overlapped in the top view direction Z of the first panel P1. More specifically, as shown in FIG. 1B, in the present disclosure, the second substrate 12 may include a first extension portion E1, and the third substrate 21 may include a second extension portion E2, wherein the first extension portion E1 may overlap with the second extension portion E2 in the top view direction Z of the first panel P1. Therefore, the width of the panel border can be reduced to improve the taste effect of the tiled light transmitting controller. In one embodiment of the present disclosure, the area of the first extension portion E1 is substantially equal to the area of the second extension portion E2. In another embodiment of the present disclosure, the first extension portion E1 substantially overlaps with the second extension portion E2 completely. However, the present disclosure not limited thereto.

In the present disclosure, the "first direction X" refers to a direction perpendicular to the top view direction Z of the first panel P1. The "displacement", for example, means that one side of the second substrate 12 extends beyond the first substrate 11 in the first direction X, and the first substrate 11 also has one side extending beyond the second substrate 12 in the direction opposite to the first direction X. Similarly, the "displacement" may also refer to, for example, that one side of the fourth substrate 22 extends beyond the third substrate 21 in the first direction X, and the third substrate 21 also has one side extending beyond the fourth substrate 22 in the direction opposite to the first direction X. The "first extension portion E1" refers to the portion of the second substrate 12 that extends beyond the first substrate 11 in the first direction X. Similarly, the "second extension portion E2" refers to the portion of the third substrate 21 extending beyond the fourth substrate 22 in the direction opposite to the first direction X.

In addition, in the present disclosure, as shown in FIG. 1B, the tiled light transmitting controller may further include a conductive wire WL, wherein at least part of the conductive wire WL may be disposed between the first extension portion E1 and the second extension portion E2. In one implementation aspect of the present disclosure, the tiled light transmitting controller may further include an adhesive member 40 arranged between the first extension portion E1 of the second substrate 12 and the second extension portion E2 of the third substrate 21. The adhesive member 40 may be provided with conductivity, so that the first panel P1 and the second panel P2 may be electrically connected by the adhesive member 40.

In one implementation aspect of the present disclosure, as shown in FIG. 1B, the tiled light transmitting controller may further include a black matrix layer BM arranged on the first panel P1 and the second panel P2, wherein the black matrix layer BM may overlap with the first seal 14 and/or the second seal 24 in the top view direction Z of the first panel P1. More specifically, the black matrix layer BM may be arranged on the first substrate 11 of the first panel P1 and the third substrate 21 of the second panel P2 and/or arranged on the second substrate 12 of the first panel P1 and the fourth substrate 22 of the second panel P2 and, in the top view direction Z of the first panel P1, the black matrix layer BM may overlap with part of the first seal 14, the second seal 24, the first extension portion E1 and the second extension portion E2, so as to improve the taste effect of the tiled light transmitting controller.

In the present disclosure, as shown in FIG. 1A, the first cover plate 301 and the first panel P1 may be fixed through an adhesive layer 41. Similarly, the second cover plate 302 and the first panel P1 may also be fixed through the adhesive layer 41.

In the present disclosure, the first cover plate 301 and the second cover plate 302 may be made of the same or different materials, and the materials of the first cover plate 301 and the second cover plate 302 may be soda lime glass or no-alkali glass, but the present disclosure is not limited thereto.

In the present disclosure, the first substrate 11, the second substrate 12, the third substrate 21 and the fourth substrate 22 may be made of the same or different materials. The materials of the first substrate 11, the second substrate 12, the third substrate 21 and the fourth substrate 22 may include glass, quartz, sapphire, ceramics, polycarbonate (PC), polyimide (PI), polyethylene terephthalate (PET), polymethylmethacrylate (PMMA), other suitable substrate materials, or a combination of the foregoing, but the present disclosure is not limited thereto.

In the present disclosure, the first light modulation layer 13 and the second light modulation layer 23 may be made of the same or different materials. The material of the first light modulation layer 13 and the second light modulation layer 23 may include, for example, a guest host type liquid crystal (GH LC), dye liquid crystal, twisted nematic liquid crystal (TN LC), super twisted nematic liquid crystal (STN LC), polymer dispersed liquid crystal (PD LC), polymer network liquid crystal (PN LC), cholesteric texture liquid crystal, polymer-stabilized cholesteric texture liquid crystal, PSCT LC), suspended particle material (SPD), electrochromic materials, etc., or a combination of the foregoing, but the present disclosure is not limited thereto.

In addition, in the present disclosure, the adhesive member 40 may be a conductive adhesive, a conductive tape, a combination of the foregoing, or other suitable conductive adhesive materials, but the present disclosure is not limited thereto. The black matrix layer BM may include black ink, resin, metal, or a combination of the foregoing, but the present disclosure is not limited thereto. The adhesive layer 41 may be a transparent adhesive material, such as polyvinyl butyral (PVB), ethylene-vinyl acetate (EVA), optical clear adhesive (OCA), optical clear resin (OCR), other suitable materials, or a combination of the foregoing, but the present disclosure is not limited thereto.

Figure 2A:
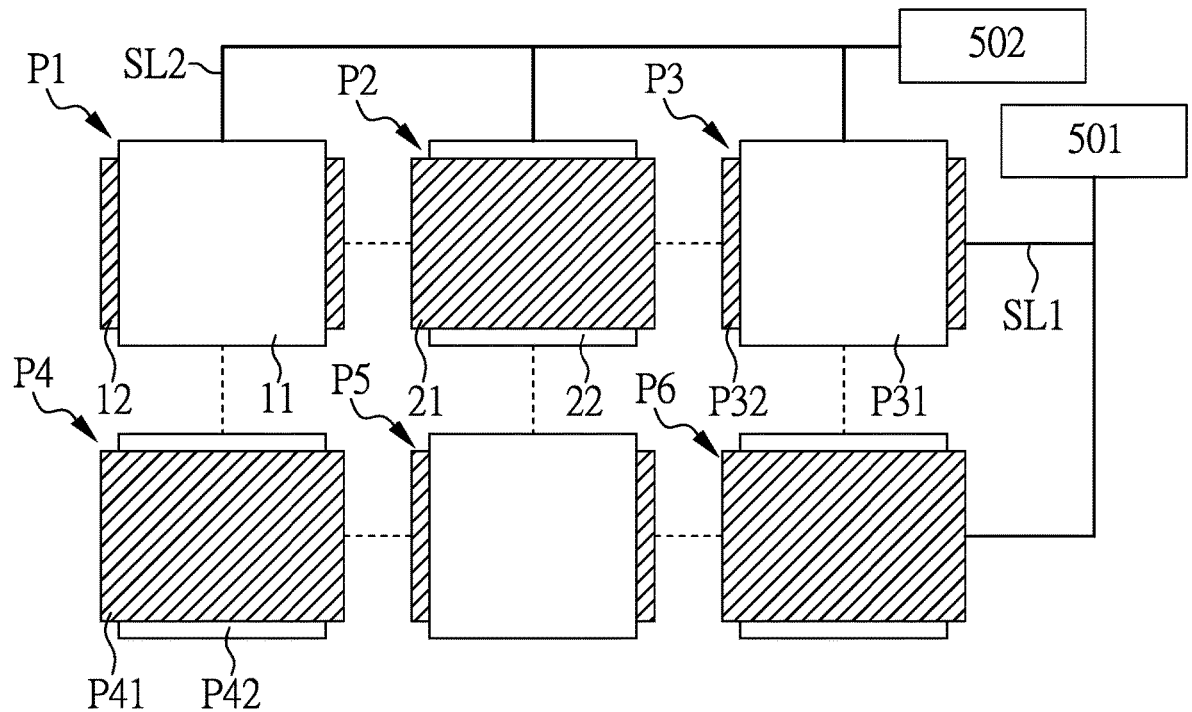
FIGS. 2A to 2C are schematic diagrams illustrating the electrical connection relationships according to some embodiments of the present disclosure.

FIG. 2A is a schematic diagram illustrating the electrical connection relationship according to an embodiment of the present disclosure. For the convenience of description, in FIG. 2A, some components are omitted, and only the electrical connection relationship between the panels is shown. In addition, the dotted line in the figure indicates that the panels are electrically connected.

In the present disclosure, as shown in FIG. 1A, a plurality of panels may be included between the first cover plate 301 and the second cover plate 302. In one embodiment of the present disclosure, as shown in FIG. 2A, for example, there may be a first panel P1, a second panel P2, a third panel P3, a fourth panel P4, a fifth panel P5, and a sixth panel P6 included. However, the present disclosure is not limited thereto. In FIG. 2A, the first panel P1 to sixth panel P6 may be arranged in a 3×2 matrix, but the present disclosure is not limited thereto. In addition, each panel may include two substrates, and a light modulation layer disposed between the two substrates. For example, the first panel P1 may include a first substrate 11, a second substrate 12, and a first light modulation layer (not shown); the second panel P2 may include a third substrate 21, a fourth substrate 22, and a second light modulation layer (not shown); the third panel P3 may include a fifth substrate P31 and a sixth substrate P32, and a third light modulation layer (not shown); the fourth panel P4 may include a seventh substrate P41, an eighth substrate P42, and a fourth light modulation layer (not shown), while the rest can be deduced by analogy. The light modulation layer can be controlled by applying a voltage to each panel through a signal source, so that the tiled light transmitting controller of the present disclosure is able to achieve the functions such as light transmitting, heat insulation, shielding and/or privacy.

In the present disclosure, as shown in FIG. 2A, the tiled light transmitting controller may further include a first signal source 501 and a second signal source 502. The first signal source 501 is connected in series with the panels in the row direction through a first signal line SL1 so as to control the signals in the row direction. The second signal source 502 is connected in series with the panels in the column direction through a second signal line SL2 so as to control the signals in the column direction. More specifically, the second substrate 12 may be connected in series with the third substrate 21 and the sixth substrate P32, and is electrically connected to the first signal source 501 through the first signal line SL1 so as to control the signals in the row direction. The first substrate 11 and the eighth substrate P42 are connected in series, and are electrically connected to the second signal source 502 through the second signal line SL2 so as to control the signals in the column direction. As a result, the tiled light transmitting controller can achieve the effect of multi-zone driving. For example, in one embodiment of the present disclosure, the second substrate 12 and the third substrate 21 are connected in series and electrically connected to the first signal source 501 through the first signal line SL1, and the first substrate 11 and the fourth substrate 22 are connected in parallel and electrically connected to the second signal source 502 through the second signal line SL2. It is noted that, although the first signal source 501 and the second signal source 502 are disposed separately in FIG. 2A, in some embodiments, the two may be disposed in the same driving circuit (for example, a driving chip).

In the present disclosure, the materials of the fifth substrate P31, the sixth substrate P32, the seventh substrate P41 and the eighth substrate P42 are similar to those of the first substrate 11, and thus a detailed description is deemed unnecessary. The materials of the third light modulation layer and the fourth light modulation layer are similar to those of the first light modulation layer, and thus a detailed description is deemed unnecessary. The "signal" may be a driving signal, a common voltage, etc., but the present disclosure is not limited thereto. In addition, the frequency of the driving signal may be, for example, 40 Hz to 120 Hz (40 Hz≤driving signal frequency≤120 Hz), but the present disclosure is not limited thereto. When the frequency of the driving signal is too high, the overall energy consumption will be increased and, if the frequency of the driving signal is too low, it is likely to have flickering and other taste problems.

Figure 2B:
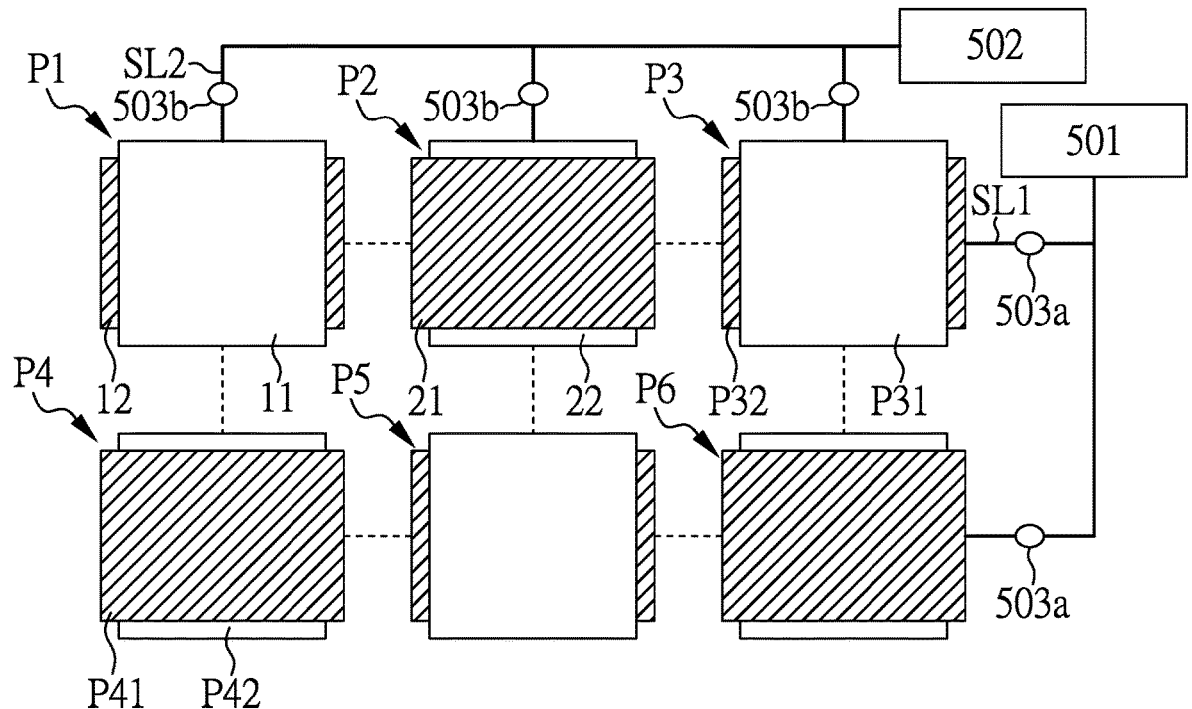

FIG. 2B is a schematic diagram illustrating the electrical connection relationship according to another embodiment of the present disclosure, wherein the dotted line in the figure represents the electrical connection between the panels, and FIG. 2B is similar to FIG. 2A except for the following differences.

As shown in FIG. 2B, in this embodiment, the tiled light transmitting controller may further include a switch element arranged between the signal source and the panel, so that the degree of light transmitting of the panel can be controlled through the switch element. More specifically, as shown in FIG. 2B, the switch element includes at least one first switch element 503a and at least one second switch element 503b. The first switch element 503a may be disposed between the first signal source 501 and the third panel P3 and/or disposed between the first signal source 501 and the sixth panel P6. The second switch element 503b may be disposed between the second signal source 502 and the first panel P1, and/or disposed between the second signal source 502 and the second panel P2, and/or disposed between the second signal source 502 and the third panel P3. Therefore, the panels in different rows may be controlled through the first switch element 503a, and the panels in different columns may be controlled through the second switch element 503b, so as to achieve the effect of multi-zone driving.

Figure 2C:
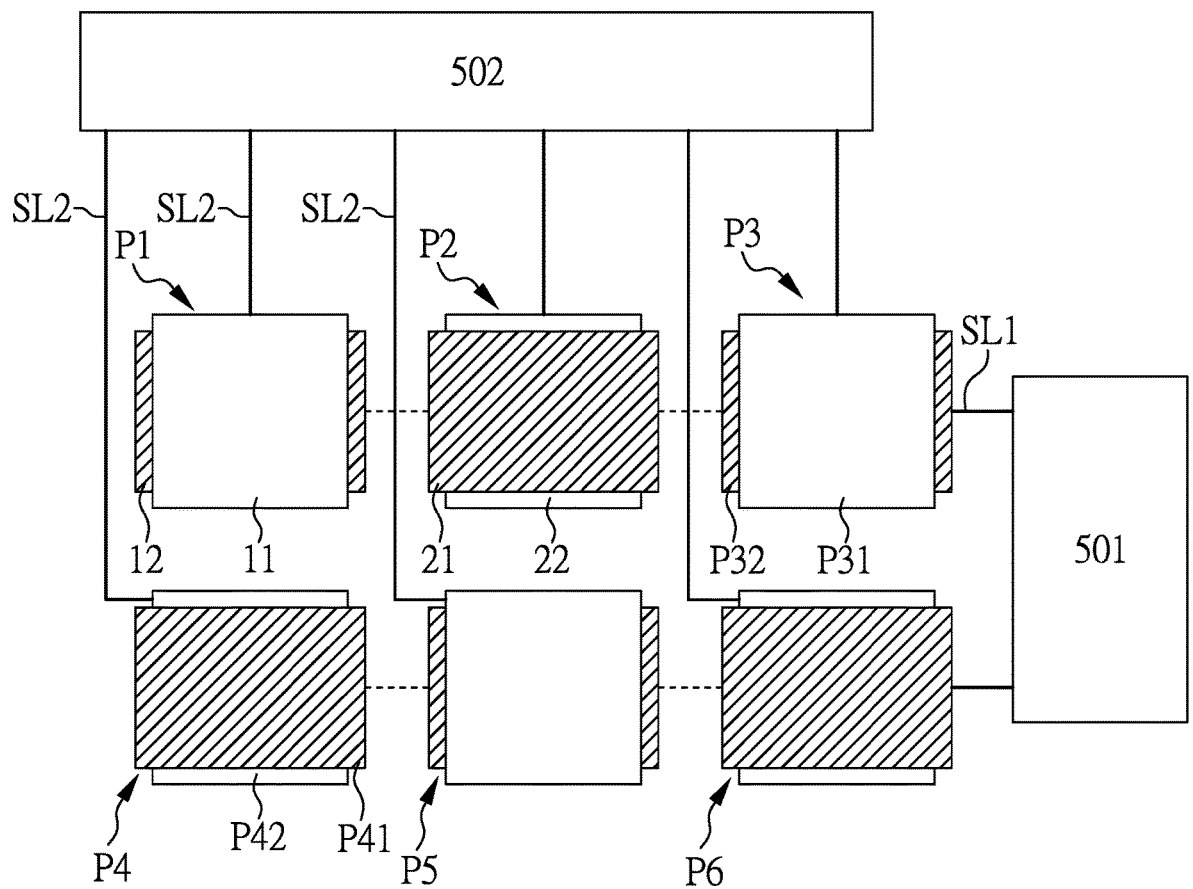

FIG. 2C is a schematic diagram illustrating the electrical connection relationship according to still another embodiment of the present disclosure, wherein the dotted line in the figure represents the electrical connection between the panels, and FIG. 2C is similar to FIG. 2A except for the following differences.

In FIG. 2A, the first signal source 501 may be connected in series with the panels in the row direction through the first signal line SL1 to control the signals in the row direction, and the second signal source 502 may be connected in series with the panels in the column direction through the second signal line SL2 to control the signals in the column direction. In this embodiment, as shown in FIG. 2C, the first signal source 501 may be connected in series with the panels in the row direction through the first signal line SL1 to control the signals in the row direction, and the second signal source 502 may be electrically connected to each of the panels through the second signal lines SL2. More specifically, different panels may be electrically connected to the second signal source 502 through different second signal lines SL2. Therefore, the second signal source 502 may transmit different signals to the panels, respectively, through the second signal line SL2 to achieve the effect of multi-zone driving.

In addition, although not shown in the figures, in other implementation aspects of this embodiment, the first signal source 501 may be electrically connected to each panel through the first signal line SL1. Therefore, the first signal source 501 may transmit different signals to the panels through the first signal lines SL1, respectively, and the second signal source 502 may be connected in series with the panels in the column direction through the second signal line SL2 so as to control the signals in the column direction.

Figure 3:
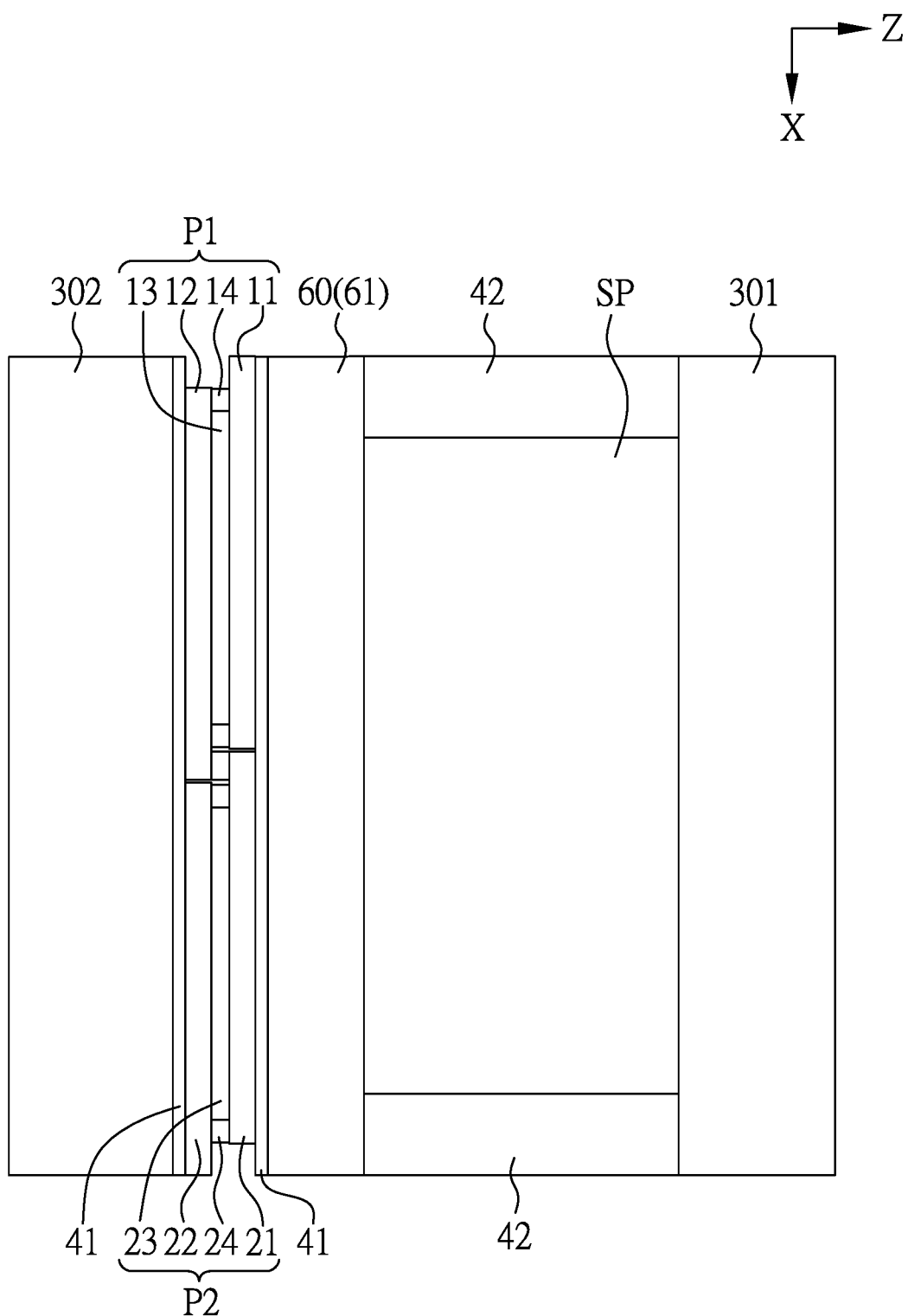
FIG. 3 is a schematic diagram illustrating the tiled light transmitting controller according to another embodiment of the present disclosure.

FIG. 3 is a schematic diagram illustrating the tiled light transmitting controller according to another embodiment of the present disclosure. The tiled light transmitting controller of FIG. 3 is similar to that of FIG. 1A except for the following differences.

As shown in FIG. 3, the tiled light transmitting controller of the present disclosure may further include a spacer layer 60 arranged between the first panel P1 and the first cover plate 301, and the first panel P1 and the spacer layer 60 may be fixed by an adhesive layer 41. In the present disclosure, the spacer layer 60 may be a light modulation component 61, a substrate, a temperature adjustment component, or other suitable elements, but the present disclosure is not limited thereto. The light modulation component 61 may include a light modulation layer (not shown), so that the light modulation component 61 is provided with a similar effect as a polarizer, which can increase the contrast of the tiled light transmitting controller and improve the dark state effect of the tiled light transmitting controller. In the present disclosure, the material of the light modulation layer is similar to that of the first light modulation layer 13, and thus a detailed description is deemed unnecessary. The temperature adjustment component may include a vacuum layer to avoid temperature loss and achieve a constant temperature effect. Alternatively, the temperature adjustment component may also include a heating metal layer or a heating coil to facilitate temperature control. Although not shown in the figures, in other implementation aspects of the present disclosure, the spacer layer 60, such as the light modulation component 61, may also be arranged between the first panel P1 and the second cover plate 302.

In addition, as shown in FIG. 3, the tiled light transmitting controller of the present disclosure may further include a sealing element 42 arranged between the first panel P1 and the first cover plate 301. More specifically, in this embodiment, the first cover plate 301 and the spacer layer 60 are coupled to each other in a face-to-face manner via the sealing element 42 so as to form an accommodation space SP, and the accommodation space SP may be filled with an inert gas to achieve a constant temperature or sound insulation effect. The sealing element 42 may be a sealant or a metal piece, but the present disclosure is not limited thereto. The inert gas may include helium, neon, argon, or a combination thereof, but the present disclosure is not limited thereto. In addition, although not shown in the figures, in other implementation aspects of the present disclosure, the sealing element 42 may also be arranged between the first panel P1 and the second cover plate 302, so that the first panel P1 and the second cover plate 302 are coupled to each other in a face-to-face manner via the sealing element 42 thereby forming an accommodation space between the first panel P1 and the second cover plate 302.

Figure 4:
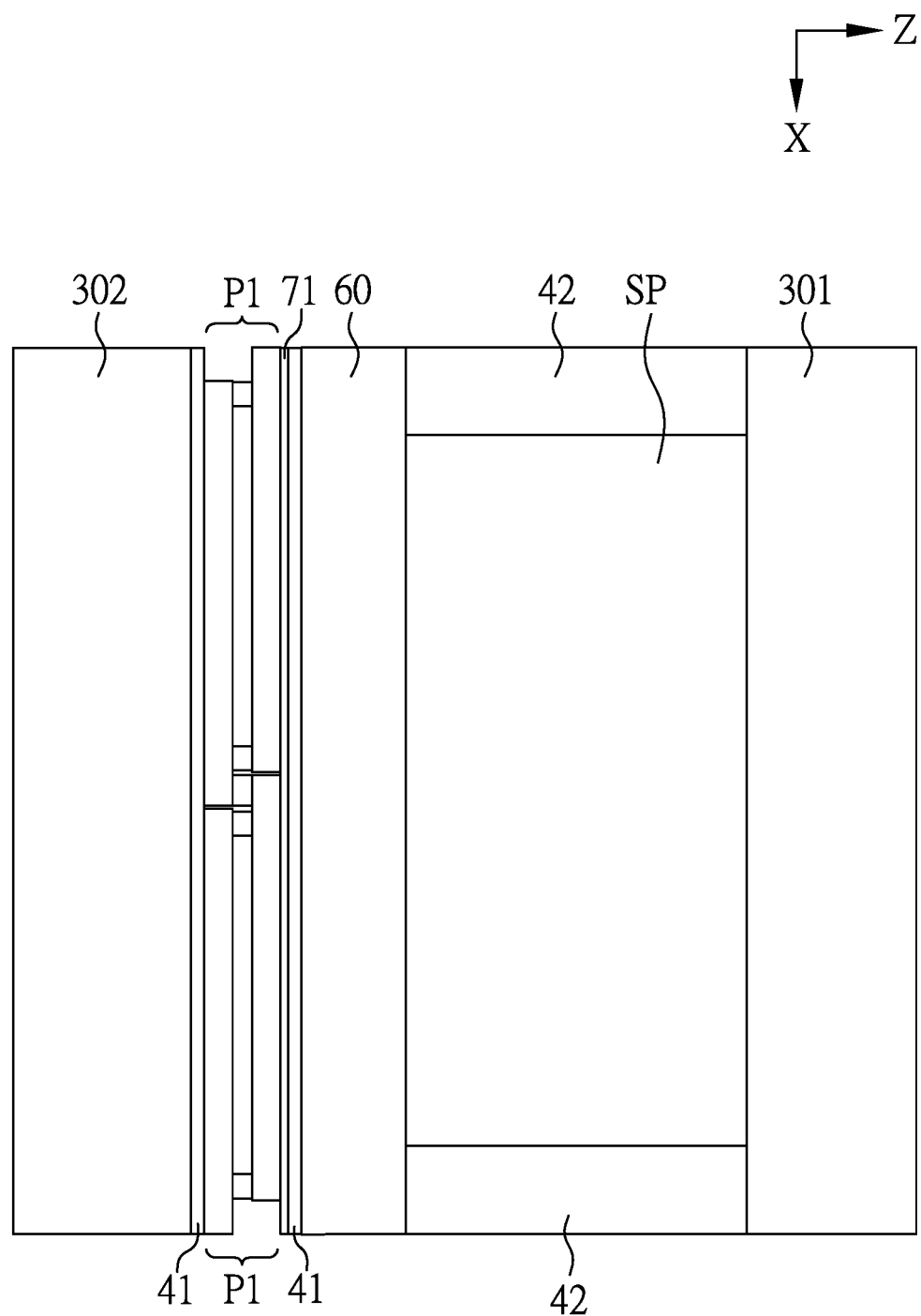
FIG. 4 is a schematic diagram illustrating the tiled light transmitting controller according to still another embodiment of the present disclosure.

FIG. 4 is a schematic diagram illustrating the tiled light transmitting controller according to still another embodiment of the present disclosure, wherein the tiled light transmitting controller of FIG. 4 is similar to that of FIG. 3 except for the following differences.

As shown in FIG. 4, the tiled light transmitting controller may further include a polarizing plate 71 arranged between the first panel P1 and the first cover plate 301. With the polarizing plate 71 collocated with the first panel P1 and the second panel P2, the contrast of the tiled light transmitting controller of the present disclosure can be improved, so as to improve the dark state effect of the tiled light transmitting controller. In addition, although not shown in the figures, in other implementation aspects of the present disclosure, the polarizing plate 71 may also be arranged between the first panel P1 and the second cover plate 302. In an implementation aspect of the present disclosure, the tiled light transmitting controller may include a plurality of polarizing plates 71, and the polarizing plates 71 may be arranged between the first panel P1 and the first cover plate 301 or between the first panel P1 and the second cover plate 302, or the polarizing plates 71 may also be arranged on both sides of the first panel P1, but the present disclosure is not limited thereto.

Figure 5:
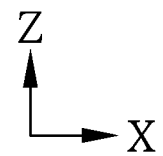
FIG. 5 is a schematic diagram illustrating the tiled light transmitting controller according to yet another embodiment of the present disclosure.
Figure 5:
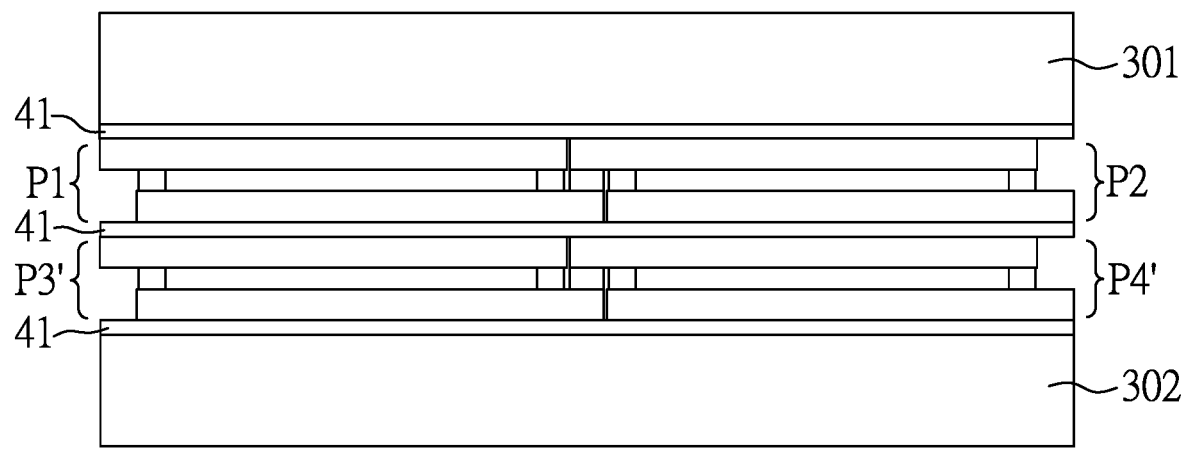

FIG. 5 is a schematic diagram illustrating the tiled light transmitting controller according to yet another embodiment of the present disclosure, wherein the tiled light transmitting controller of FIG. 5 is similar to that of FIGS. 1A and 1B except for the following differences.

As shown in FIG. 5, the tiled light transmitting controller may further include a plurality of panels, such as a third panel P3' and a fourth panel P4' arranged between the first panel P1 and the second cover plate 302, wherein the third panel P3' is electrically connected to the fourth panel P4'. In this embodiment, the structure of the third panel P3' and the fourth panel P4' is similar to that of the first panel P1 and the second panel P2, as shown in FIG. 1B, and thus a detailed description is deemed unnecessary. In addition, the first panel P1 and the second panel P2 may be fixed to the third panel P3' and the fourth panel P4' through the adhesive layer 41. With the collocation of the first panel P1, the second panel P2, the third panel P3' and the fourth panel P4', the contrast of the tiled light transmitting controller can be increased, and the dark state effect of the tiled light transmitting controller can be improved. In addition, although not shown in the figures, in other implementation aspects of the present disclosure, the third panel P3' and the fourth panel P4' may also be arranged between the first panel P1 and the first cover plate 301.

Figure 6:
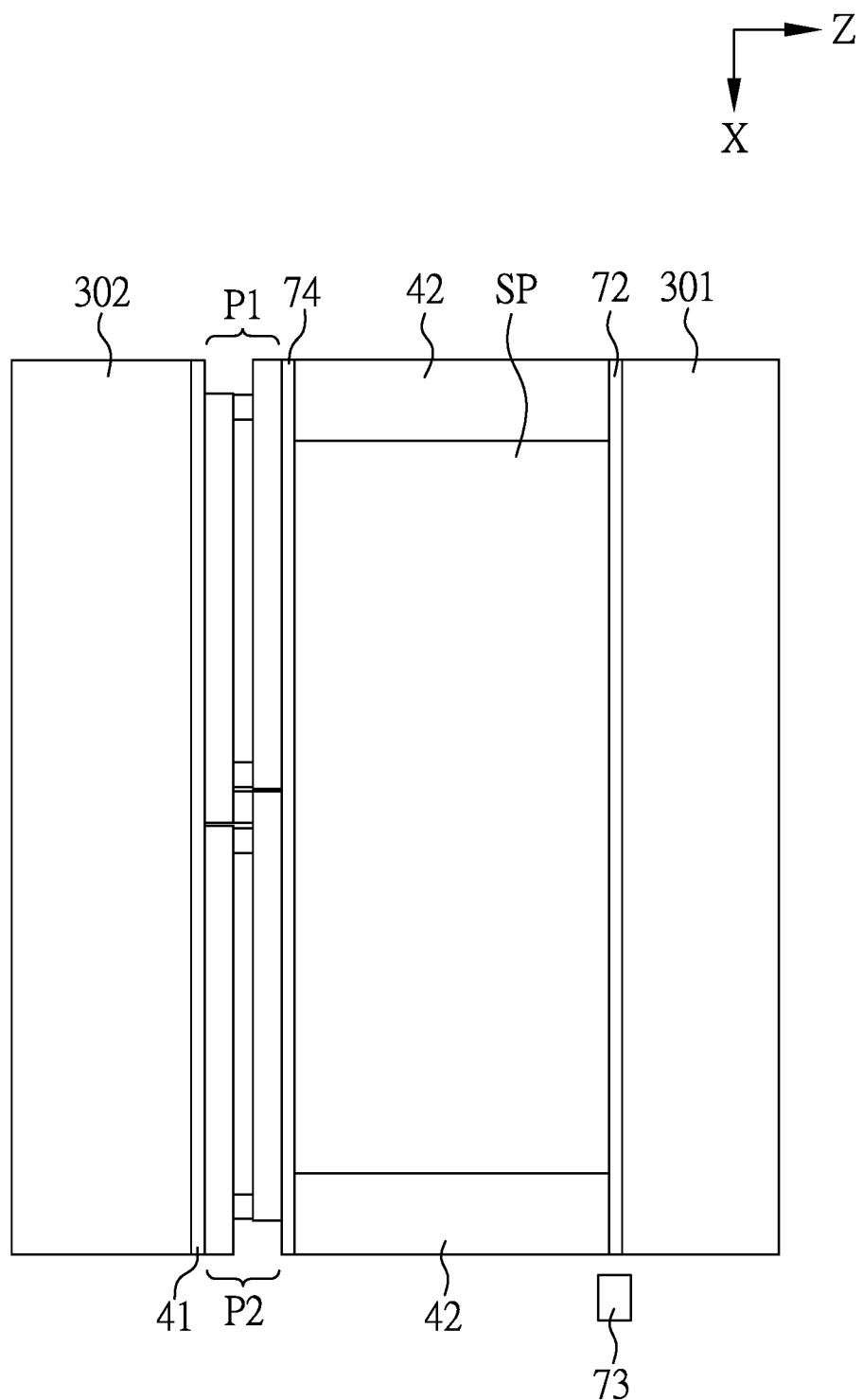
FIG. 6 is a schematic diagram illustrating the tiled light transmitting controller according to further another embodiment of the present disclosure.

FIG. 6 is a schematic diagram illustrating the tiled light transmitting controller according to further another embodiment of the present disclosure, wherein the tiled light transmitting controller of FIG. 6 is similar to that of FIG. 3 except for the following differences.

As shown in FIG. 6, the tiled light transmitting controller may further include a light guide plate 72 arranged on the first cover plate 301, and a light source 73 arranged on a light incident surface of the light guide plate 71. Therefore, the tiled light transmitting controller of the present disclosure may be converted into a color panel for being applied to advertisement, decoration and other purposes. In the present disclosure, the light source 73 is not particularly limited, and it may be a suitable light source such as a light emitting diode (LED) or a glass lamp tube, but the present disclosure is not limited thereto. When the light source 73 is a glass lamp tube, the inner wall of the glass lamp tube may be coated with colored fluorescent powder, and the glass lamp tube may be filled with inert gas to provide a colored light source. In addition, as shown in FIG. 6, the light source 73 is an edge type light source, but in other embodiments of the present disclosure, the light source 73 may also be a direct type light source. More specifically, the light source 73 may be arranged on the first cover plate 301, and disposed between the first cover plate 301 and the light guide plate 72. In one embodiment of the present disclosure, the tiled light transmitting controller may further include a reflective layer (not shown) arranged on the first cover plate 301, and disposed between the first cover plate 301 and the light guide plate 72 to improve the utilization of light source. In the present disclosure, the material of the reflective layer may include metal, metal oxide, such as zinc oxide, titanium oxide, or a combination thereof, but the present disclosure is not limited thereto.

In one embodiment of the present disclosure, as shown in FIG. 6, the tiled light transmitting controller may further include an anti-reflection layer 74 arranged on the first panel P1. More specifically, the anti-reflection layer 74 is arranged between the first panel P1 and the light guide plate 72 to reduce the influence of ambient light on the tiled light transmitting controller, thereby improving the display quality. In this embodiment, the material of the anti-reflection layer 74 may include magnesium fluoride ($MgF_2$), silicon oxide, fluorinated polymer, other suitable materials, or a combination of the foregoing, but the present disclosure is not limited thereto.

Figure 7A:
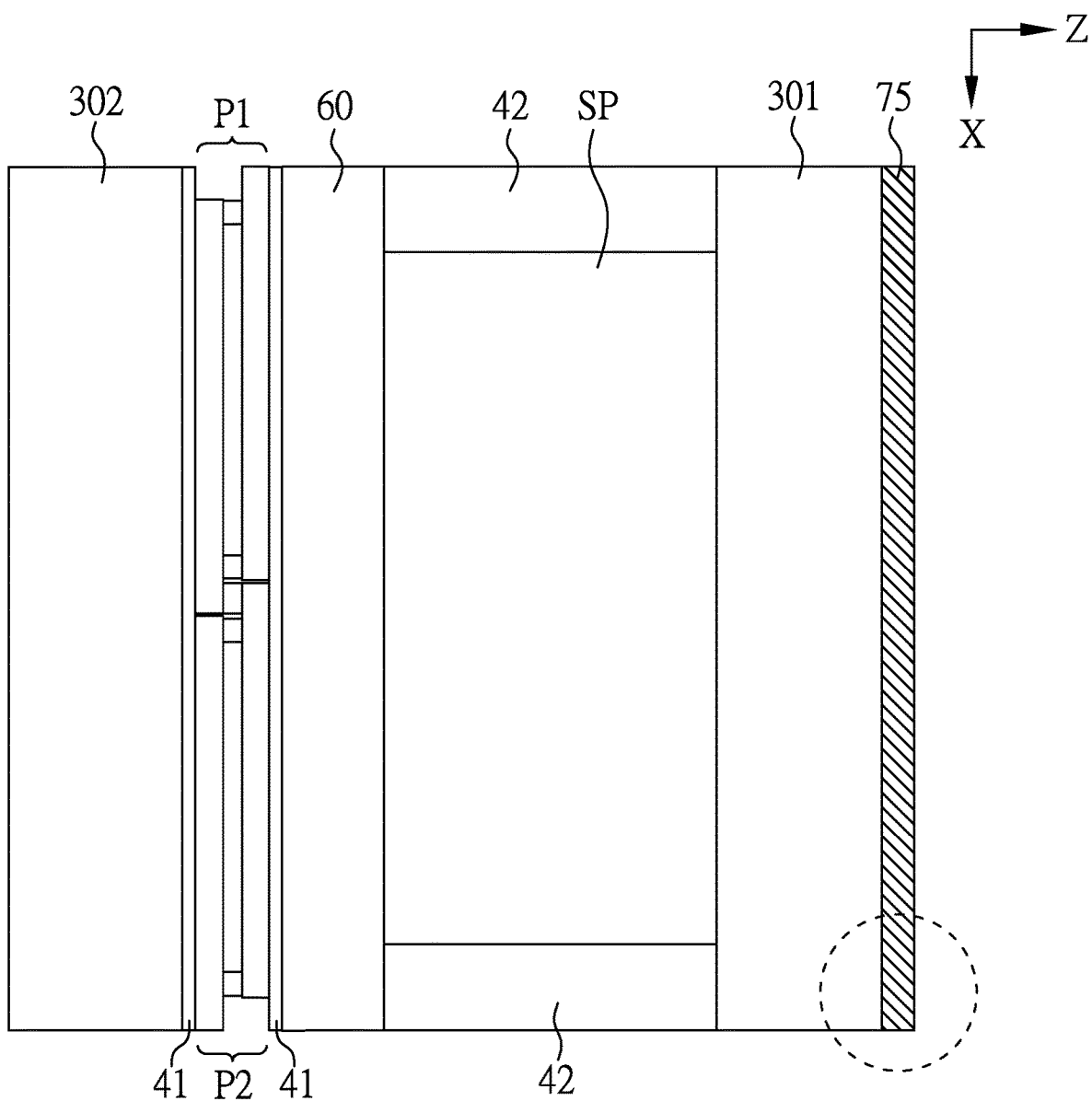
FIG. 7A is a schematic diagram illustrating the tiled light transmitting controller according to still further another embodiment of the present disclosure.
Figure 7B:
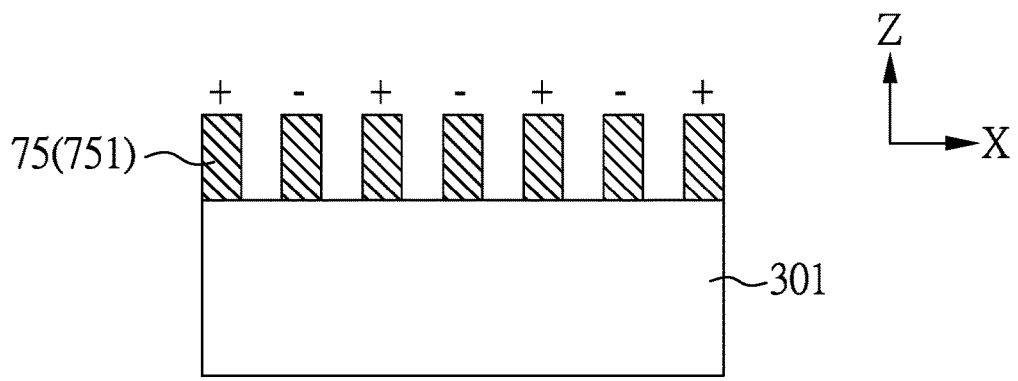
FIG. 7B is a partial enlarged view of FIG. 7A.

FIG. 7A is a schematic diagram illustrating the tiled light transmitting controller according to still further another embodiment of the disclosure, and FIG. 7B is a partial enlarged view of FIG. 7A, wherein the tiled light transmitting controller of FIG. 7A is similar to that of FIG. 3 except for the following differences.

As shown in FIG. 7A, the tiled light transmitting controller may further include a metal layer 75 arranged on the first cover plate 301 and, more specifically, the first cover plate 301 is arranged between the first panel P1 and the metal layer 75. The metal layer 75 may be used for heating, or dust collection. As shown in FIG. 7B, the metal layer 75 may be patterned to metal bumps 751. In one embodiment of the present disclosure, by applying a voltage to different metal bumps 751, an electric field can be formed between different metal bumps 751, which can be used for dust collection or other purposes. In addition, although not shown in the figures, in other embodiments of the present disclosure, the metal layer 75 may also be arranged on the second cover plate 302.

Figure 8:
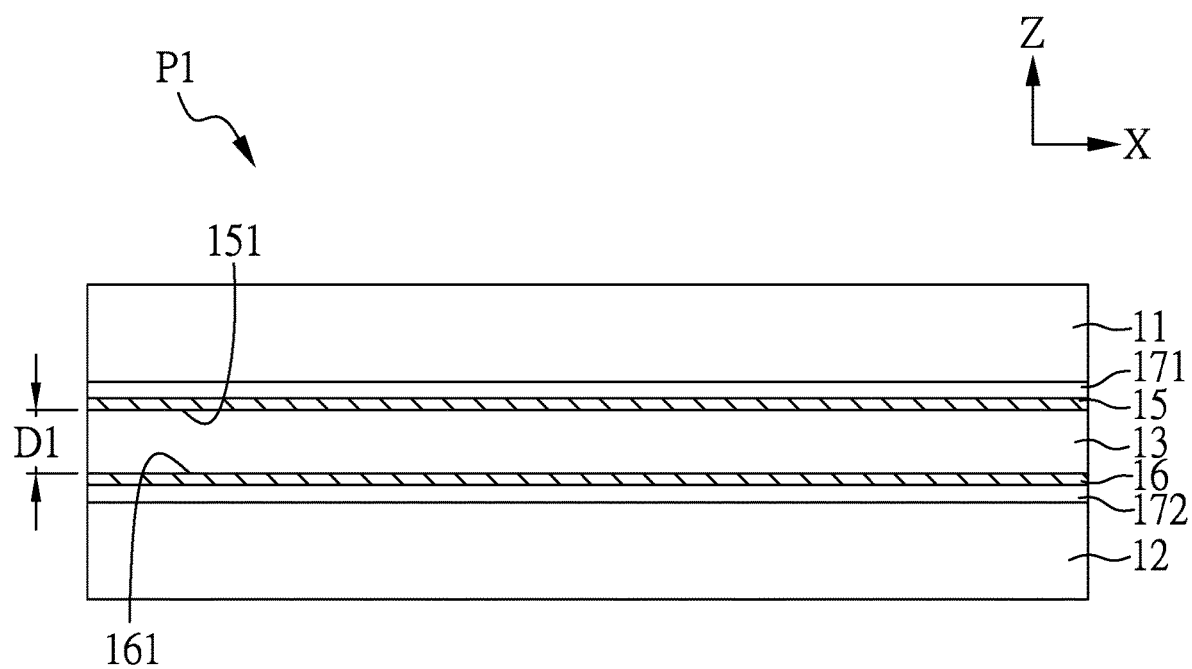
FIG. 8 is a schematic diagram illustrating part of the first panel according to an embodiment of the present disclosure.

FIG. 8 is a schematic diagram illustration part of the first panel according to an embodiment of the disclosure. In the present disclosure, the structure of each panel shown in FIG. 1A to FIG. 7A may be as shown in FIG. 8, and the first panel P1 is taken as an example for illustration.

As shown in FIG. 8, the first panel P1 may include: a first substrate 11; a second substrate 12 arranged to be opposite to the first substrate 11; a first conductor layer 15 arranged on the first substrate 11; a second conductor layer 16 arranged on the second substrate 12; a first light modulation layer 13 arranged between the first conductor layer 15 and the second conductor layer 16; and a first insulation layer 171 arranged between the first light modulation layer 13 and the first substrate 11. By applying a voltage to the first conductor layer 15 and the second conductor layer 16 to control the first light modulation layer 13, the first panel P1 can be made to achieve the functions of light transmitting, heat insulation, shielding and/or privacy. Therefore, when applying different voltages to the conductor layers of each panel in the tiled light transmitting controller (for example, as shown in FIG. 1A to FIG. 7A), the tiled light transmitting controller of the present disclosure is able to achieve the effect of multi-zone driving.

As shown in FIG. 8, the first panel P1 may further include a second insulation layer 172, wherein the first insulation layer 171 is arranged between the first light modulation layer 13 and the first substrate 11, and the second insulation layer 172 is arranged between the first light modulation layer 13 and the second substrate 12. In addition, in FIG. 8, the first insulation layer 171 is arranged between the first substrate 11 and the first conductor layer 15, and the second insulation layer 172 is arranged between the second substrate 12 and the second conductor layer 172, but the present disclosure is not limited thereto. In other implementation aspects of the present disclosure, the first insulation layer 171 may also be arranged between the first conductor layer 15 and the first light modulation layer 13, and the second insulation layer 172 may also be arranged between the second conductor layer 16 and the first light modulation layer 13. With the arrangement of the first insulation layer 171 and/or the second insulation layer 172, it is able to achieve the effects of improving the halo phenomenon or protecting the conductor layer.

In addition, although not shown in the figures, in another implementation aspect of the present disclosure, the first panel P1 may optionally further include an alignment layer arranged between the first light modulation layer 13 and the first conductor layer 1 and, more specifically, the alignment layer may be in direct contact with the first light modulation layer 13 to achieve the alignment function. In addition, the first panel P1 may optionally further include another alignment layer arranged between the first light modulation layer 13 and the second conductor layer 16 and, more specifically, the alignment layer may be in direct contact with the first light modulation layer 13 to achieve the alignment function.

In the present disclosure, the materials of the first conductor layer 15 and the second conductor layer 16 may be the same or different, for example, may include metal, metal oxide, alloy thereof, or a combination thereof, such as gold, silver, copper, aluminum, platinum, indium zinc oxide (IZO), indium tin oxide (ITO), indium tin zinc oxide (ITZO), indium gallium zinc oxide (IGZO), or aluminum zinc oxide (AZO), but the present disclosure is not limited thereto. The thicknesses of the first conductor layer 15 and the second conductor layer 16 may each be independently 150 angstroms (Å) to 2000 angstroms (150 angstroms thickness 2000 angstroms), but not limited thereto. In addition, the distance D1 between the first conductor layer 15 and the second conductor layer 16 may be 3 micrometers (μm) to 25 micrometers (3 micrometers≤D1≤25 micrometers), but not limited thereto. When the distance D1 between the first conductor layer 15 and the second conductor layer 16 is too small, a short circuit is likely to occur and, when the distance D1 between the first conductor layer 15 and the second conductor layer 16 is too large, it is disadvantageous to the control of the light modulation layer 13. In this embodiment, the distance D1 between the first conductor layer 15 and the second conductor layer 16 refers to the distance between a lower surface 151 of the first conductor layer 15 and an upper surface 161 of the second conductor layer 16 in the top view direction Z of the first panel P1. More specifically, three to five measurement points may be taken on the upper surface 161 of the second conductor layer 16 and, after measuring the distance between each measurement point and the lower surface 151 of the first conductor layer 15 in the top view direction Z, the average value of the measured distances is taken as the distance D1.

The materials of the first insulation layer 171 and the second insulation layer 172 may be the same or different, which may be silicon oxynitride ($SiO_xN_y$), silicon oxide, silicon nitride, nitrogen-doped silicon carbide (SiNC), or a combination thereof, but the present disclosure is not limited thereto. The thicknesses of the first insulation layer 171 and the second insulation layer 172 may each be 300 angstroms to 1000 angstroms (300 angstroms≤thickness≤1000 angstroms), but not limited thereto. The material of the alignment layer may be polyimide (PI), polymethyl methacrylate (PMMA), silicon oxide, silicon nitride, or a combination thereof, but the present disclosure is not limited thereto.

Figure 9A:
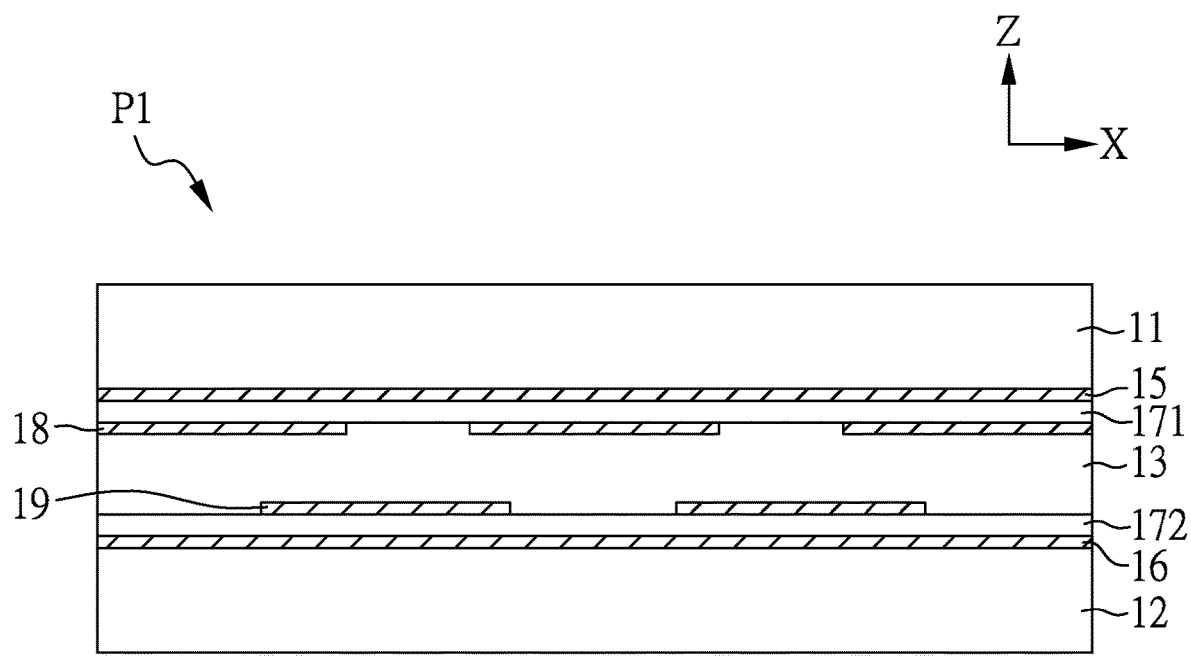
FIGS. 9A and 9B are schematic diagrams illustrating part of the first panel according to some embodiments of the present disclosure.

FIG. 9A is a schematic diagram illustrating part of the first panel according to an embodiment of the present disclosure. The first panel P1 of FIG. 9A is similar to that of FIG. 8 except for the following differences. In the present disclosure, the structure of each panel shown in FIGS. 1A to 7A may be as shown in FIG. 9A, and the first panel P1 is taken as an example for illustration.

As shown in FIG. 9A, the first panel P1 may further include: a third conductor layer 18 arranged on the first substrate 11, wherein the first insulation layer 171 is disposed between the first conductor layer 15 and the third conductor layer 18; a fourth conductor layer 19 arranged on the second substrate 12; and a second insulation layer 172 arranged between the second conductor layer 16 and the fourth conductor layer 19, wherein the third conductor layer 18 and the fourth conductor layer 19 at least partially overlap in the top view direction Z of the first panel P1. In this embodiment, the materials of the third conductor layer 18 and the fourth conductor layer 19 may be similar to those of the first conductor layer 15 or the second conductor layer 16, and thus a detailed description is deemed unnecessary.

When applying voltage to the first conductor layer 15 and the second conductor layer 16, the entire first light modulation layer 13 can be rendered light-transmitting so as to achieve the effect of controlling the transmittance of the entire first panel P1. When applying voltage to the first conductor layer 15 and the fourth conductor layer 19, or applying voltage to the second conductor layer 16 and the third conductor layer 18, the first light modulation layer 13 can be locally rendered light-transmitting so as to achieve a local light transmitting state thereby controlling the transmittance of the first panel P1. In addition, when the first light modulating layer 13 is a cholesteric liquid crystal, the tiled light transmitting controller of the present disclosure can be applied to a handwriting board, etc., so that the handwriting board may achieve the function of partial erase, but the present disclosure is not limited thereto.

Figure 9B:
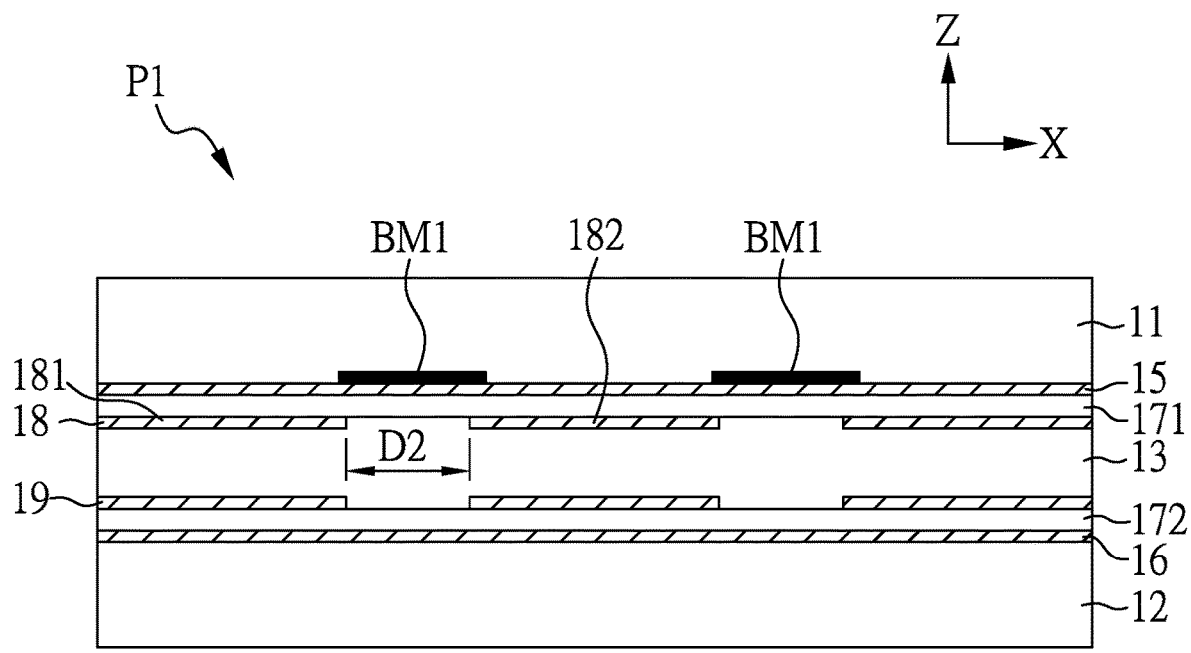

FIG. 9B is a schematic diagram illustrating part of the first panel according to another embodiment of the present disclosure. The first panel P1 of FIG. 9B is similar to that of FIG. 9A except for the following differences. In the present disclosure, the structure of each panel shown in FIGS. 1A to 7A may be as shown in FIG. 9BA, and the first panel P1 is taken as an example for illustration.

In FIG. 9A, the third conductor layer 18 and the fourth conductor layer 19 partially overlap in the top view direction Z of the first panel P1. In another embodiment of the present disclosure, as shown in FIG. 9B, in the top view direction Z, the third conductor layer 18 and the fourth conductor layer 19 substantially completely overlap. When performing local control, the first light modulation layer 13 that does not overlap with the third conductor layer 18 or the fourth conductor layer 19 in the top view direction Z is not easily controlled by the electric field, which will influence the effect of controlling the light transmittance. Therefore, the third conductor layer 18 of the present disclosure may further include a first electrode 181 and a second electrode 182, wherein, in the cross-sectional view, the distance D2 between the first electrode 181 and the second electrode 182 may be greater than 0 micrometer and smaller than or equal to 20 micrometers (0 micrometer≤D2≤20 micrometers), so as to improve the effect of local control.

In addition, in an implementation aspect of this embodiment, the first panel P1 may further include a first black matrix layer BM1, and the first black matrix layer BM1 at least partially overlaps with the third conductor layer 18 or the fourth conductor layer 19 in the top view direction Z of the first panel P1. The first black matrix layer BM1 may be used to shield the space between the electrodes thereby improving the taste effect. In the present disclosure, the first black matrix layer BM1 may include black ink, resin, metal, or a combination of the foregoing, but the present disclosure is not limited thereto.

The aforementioned specific embodiments should be construed as merely illustrative, and not limiting the rest of the present disclosure in any way.

What is claimed is:

1. A tiled light transmitting controller, comprising:
    a first panel including a first substrate and a second substrate disposed under the first substrate;
    a second panel electrically connected to the first panel, wherein the second panel includes a third substrate and a fourth substrate disposed under the third substrate, and the second substrate is electrically connected to the third substrate;
    a first cover plate;
    a second cover plate arranged to be opposite to the first cover plate, wherein the first panel and the second panel are arranged between the first cover plate and the second cover plate;
    a first signal source; and
    a second signal source, wherein the first signal source is connected in series with the first panel and the second panel through a first signal line, and the second signal source is electrically connected to the first panel and the second panel, respectively, through a second signal line.

2. The tiled light transmitting controller as claimed in claim 1, wherein the second substrate includes a first extension portion, the third substrate includes a second extension portion, and the first extension portion overlaps with the second extension portion in a top view direction of the first panel.

3. The tiled light transmitting controller as claimed in claim 2, further comprising a conductive wire, wherein at least part of the conductive wire is disposed between the first extension portion and the second extension portion.

4. The tiled light transmitting controller as claimed in claim 1, wherein the second substrate and the third substrate are connected in series and electrically connected to the first signal source through the first signal line, and the first substrate and the fourth substrate are connected in parallel and electrically connected to the second signal source through the second signal line.

5. The tiled light transmitting controller as claimed in claim 1, wherein the first panel includes: a first light modulation layer arranged between the first substrate and the second substrate; and a first seal arranged between the first substrate and the second substrate, and surrounding the first light modulation layer; wherein the second panel includes: a second light modulation layer arranged between the third substrate and the fourth substrate; and a second seal arranged between the third substrate and the fourth substrate, and surrounding the second light modulation layer.

6. The tiled light transmitting controller as claimed in claim 5, further comprising a black matrix layer arranged on the first panel and the second panel, wherein the black matrix layer overlaps with the first seal or the second seal in a top view direction of the first panel.

7. The tiled light transmitting controller as claimed in claim 1, further comprising:
a third panel arranged between the first panel and the first cover plate or between the first panel and the second cover plate; and
a fourth panel arranged between the second panel and the first cover plate or between the second panel and the second cover plate,
wherein the third panel is electrically connected with the fourth panel.

8. The tiled light transmitting controller as claimed in claim 1, further comprising:
a spacer layer arranged between the first panel and the first cover plate; and
a sealing element arranged between the first panel and the first cover plate,
wherein an accommodation space is formed between the first cover plate and the spacer layer coupled to each other in a face-to-face manner via the sealing element.

9. The tiled light transmitting controller as claimed in claim 1, wherein the first panel further comprises:
a first conductor layer arranged on the first substrate;
a second conductor layer arranged on the second substrate;
a first light modulation layer arranged between the first conductor layer and the second conductor layer;
a first insulation layer arranged between the first light modulation layer and the first substrate;
a third conductor layer arranged on the first substrate, wherein the first insulation layer is disposed between the first conductor layer and the third conductor layer;
a fourth conductor layer arranged on the second substrate; and
a second insulation layer arranged between the second conductor layer and the fourth conductor layer,
wherein the third conductor layer and the fourth conductor layer at least partially overlap in a top view direction of the first panel.

10. The tiled light transmitting controller as claimed in claim 3, further comprising an adhesive member arranged between the first extension portion of the second substrate and the second extension portion of the third substrate, wherein the adhesive member is provided with conductivity.

11. The tiled light transmitting controller as claim in claim 4, further comprising at least one first switch element and at least one second switch element, wherein a first switch element is arranged between the first signal source and the second panel, a second switch element is arranged between the second signal source and the first panel, and the second switch element is arranged between the second signal source and the second panel.

12. The tiled light transmitting controller as claimed in claim 8, wherein the first panel and the spacer layer are fixed through an adhesive layer, and the spacer layer is a light modulation element.

13. The tiled light transmitting controller as claimed in claim 8, further comprising a polarizing plate arranged between the first panel and the first cover plate.

14. The tiled light transmitting controller as claimed in claim 8, further comprising a light guide plate arranged on the first cover plate; and a light source arranged on a light incident surface of the light guide plate.

15. The tiled light transmitting controller as claimed in claim 14, further comprising an anti-reflection layer arranged on the first panel and disposed between the first panel and the light guide plate.

16. The tiled light transmitting controller of claim 8, further comprising a metal layer arranged on the first cover plate, wherein the first cover plate is disposed between the first panel and the metal layer.

17. The tiled light transmitting controller as claimed in claim 16, wherein the metal layer is patterned to metal bumps.

18. The tiled light transmitting controller as claimed in claim 9, wherein the third conductor layer and the fourth conductor layer completely overlap, and the third conductor layer further includes a first electrode and a second electrode in which a distance between the first electrode and the second electrode is greater than 0 micrometer and smaller than or equal to 20 micrometers.

* * * * *